Nov. 30, 1937.  G. P. GAVIN  2,100,389
FLOW CONTROL FOR URINALS AND THE LIKE
Filed July 31, 1937
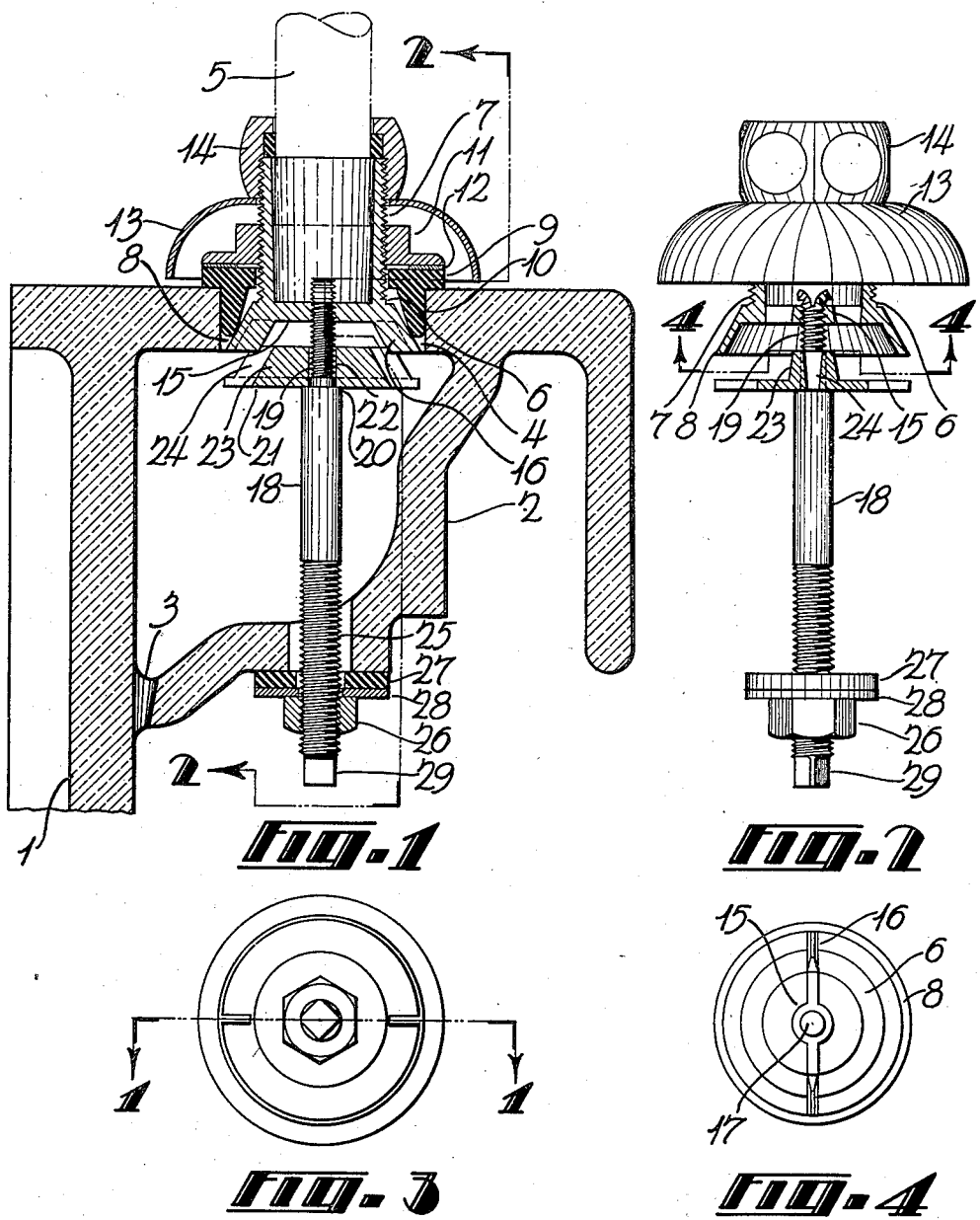
INVENTOR
GORDON P. GAVIN
BY Lyman C. Conger
ATTORNEY Patented Nov. 30, 1937

2,100,389

UNITED STATES PATENT OFFICE 2,100,389

FLOW CONTROL FOR URINALS AND THE LIKE

Gordon P. Gavin, Kohler, Wis.

Application July 31, 1937, Serial No. 156,620

3 Claims. (Cl. 4—75)

My invention relates to flow controls for urinals and the like and the objects of my invention are, first, to provide means associated with the fixture for controlling the flow of flushing water through a plumbing fixture, and second, to provide readily accessible adjusting means therefor.

With the foregoing and related objectives in view, the invention consists in the mechanism illustrated and described in the accompanying drawing, in which Figure 1 is a center sectional view of the flow control and also a portion of a urinal showing the method of attachment of the control thereto, the sectional view of the control being taken along the lines 1—1 of Figure 3; Figure 2, a side elevation, partly in section, of the flow control; Figure 3, a plan view of the control; and Figure 4, a bottom view of the spud connection forming a part of said control.

In the drawing the numeral 1 indicates a plumbing fixture such as a urinal, provided with a hollow flushing rim 2, flushing ports 3 providing communication between said flushing rim and the portions of said fixture to be flushed. The flushing rim 2 is also provided, at its top as shown, or at the rear thereof if desired, with an inlet aperture 4 into which a supply pipe 5, leading from a flush tank or flush valve, is adapted to discharge.

When the supply pipe is coupled directly to the fixture, as by the conventional spud, the flow is not matched to the fixture and often causes overflowing and splashing during the flushing period. By the use of my flow control the flow may be so regulated as to give the most efficient rate of discharge possible without splashing or overflowing.

The flow control is interposed between the supply pipe 5 and the flushing rim 2 and comprises a tubular spud connection 6 threaded at 7 and provided with an outwardly flaring or bell-shaped flange 8. At its lower extremity an annular spud washer 9, of rubber or other resilient material, encircles the spud connection 6, overlies the fixture adjacent the aperture and has a portion 10 extending within said aperture and adjacent the flange 8. A nut 11 is threaded on the spud connection 6, a thrust washer 12 being interposed between the nut and the spud washer 9 to prevent damage to the latter by the action of the nut 11.

Tightening of the nut 11 draws the flange 8 upwardly expanding the portion 10 of the spud washer 9 and forcing it against the walls of the aperture 4, thus forming a fluid-tight connection.

An escutcheon 13, secured by a nut 14, is preferably added for aesthetic reasons.

The spud connection 6 is provided with a web 15 extending thereacross and formed at its extremities into a pair of outstanding lugs 16. The web 15 is also provided, at its median point, with a threaded aperture 17.

A flow regulating stem 18 is threaded at its upper extremity 19 to have engagement with the threaded aperture 17. The lower portion of the stem 18 is larger in diameter than the threaded portion 19, thus forming the shoulder 20.

A flow regulating disc 21 is apertured at 22 to fit over the threaded portion 19 of the stem 18 but to abut the shoulder 20 thereof. The disc 21 is also provided with a boss 23 containing grooves 24 adapted to receive the lugs 16.

The stem 18 extends through an aperture 25 provided in the flushing rim 2 for that purpose and is threaded at its lower portion to receive the nut 26 which is adapted to compress the resilient washer 27 to hold the regulating stem in position on the flushing rim against the flushing rim 2 to prevent leakage, a thrust washer 28 being interposed to prevent damage to the washer 27.

The extremity 29 of the stem 18 is squared to receive a wrench or slotted to receive a screwdriver so that it may be rotated by means of such a tool.

The threaded portion 19 of the stem 18 is preferably clinched at its upper extremity, as shown in Figure 2, to prevent its complete removal from the web 15.

It will be seen that by rotating the flow regulating stem the flow regulating disc 21 may be caused to travel upwardly or downwardly through the engagement of the threaded portion 19 of the stem 18 with the threaded aperture 17. It will be understood that the disc 21 is always forced downward into engagement with the shoulder 20 by the pressure of the fluid, thus the position of said shoulder will determine the position of the disc. The engagement of the lugs 16 with the grooves 24 prevents rotation of the disc 21.

Thus by rotation of the adjusting stem 18 and varying the size of the orifice between the flange 8 and the flow control disc 21 any desired rate of flow may be attained. This rate will ordinarily be the maximum rate possible without causing overflowing or splashing.

Since the stem 18 extends outside the fixture it is readily accessible and adjustment can be made without disturbing the connections to the fixture in any manner.

It will be understood that the specific construction herein disclosed is for the purpose of illustration only and that various modifications thereof may be made without departing from the spirit of the invention; therefore I do not limit myself to the specific details of the construction disclosed but claim all constructions within the scope of the appended claims.

I claim:

1. A flow control for a plumbing fixture comprising a tubular spud connection having an outwardly flaring flange at its lower extremity, means for connecting said spud connection to a flushing rim, means for connecting a supply pipe to said spud connection, a web extending across the interior of said spud connection, a plurality of lugs on said web, a flow regulating stem having threaded connection with said web, a shoulder on said flow regulating stem, a flow regulating disc positioned on said flow regulating stem and abutting said shoulder, said flow regulating disc being grooved to receive the aforesaid lugs, means for holding said regulating stem in position on a flushing rim, and means on one extremity of said flow regulating stem adapted for engagement by a tool whereby to rotate said stem.

2. A flow control for a plumbing fixture comprising a spud connection, means for connecting said spud connection to a flushing rim, a web extending across the interior of said spud connection, a flow regulating stem having threaded connection with said web, a flow regulating disc positioned on said flow regulating stem, said disc being adapted to be adjustable by means of said flow regulating stem to abut said spud connection whereby to regulate the flow of fluid therethrough.

3. The combination in a plumbing fixture of a flushing rim, an aperture therein, a spud connection positioned in said aperture, a second aperture in said flushing rim, a flow regulating stem having threaded connection with said spud connection and extending through said second mentioned aperture, and a flow regulating disc positioned on said flow regulating stem and adjustable thereby to regulate the flow of fluid through said spud connection.

GORDON P. GAVIN.